March 22, 1938. M. H. SIDEBOTHAM 2,112,121
METHOD AND MACHINE FOR MAKING LOCKED CORNER BOXES
Filed June 3, 1936 6 Sheets-Sheet 1

Inventor
Melvin H. Sidebotham

March 22, 1938.   M. H. SIDEBOTHAM   2,112,121
METHOD AND MACHINE FOR MAKING LOCKED CORNER BOXES
Filed June 3, 1936   6 Sheets-Sheet 2

Inventor
Melvin H. Sidebotham

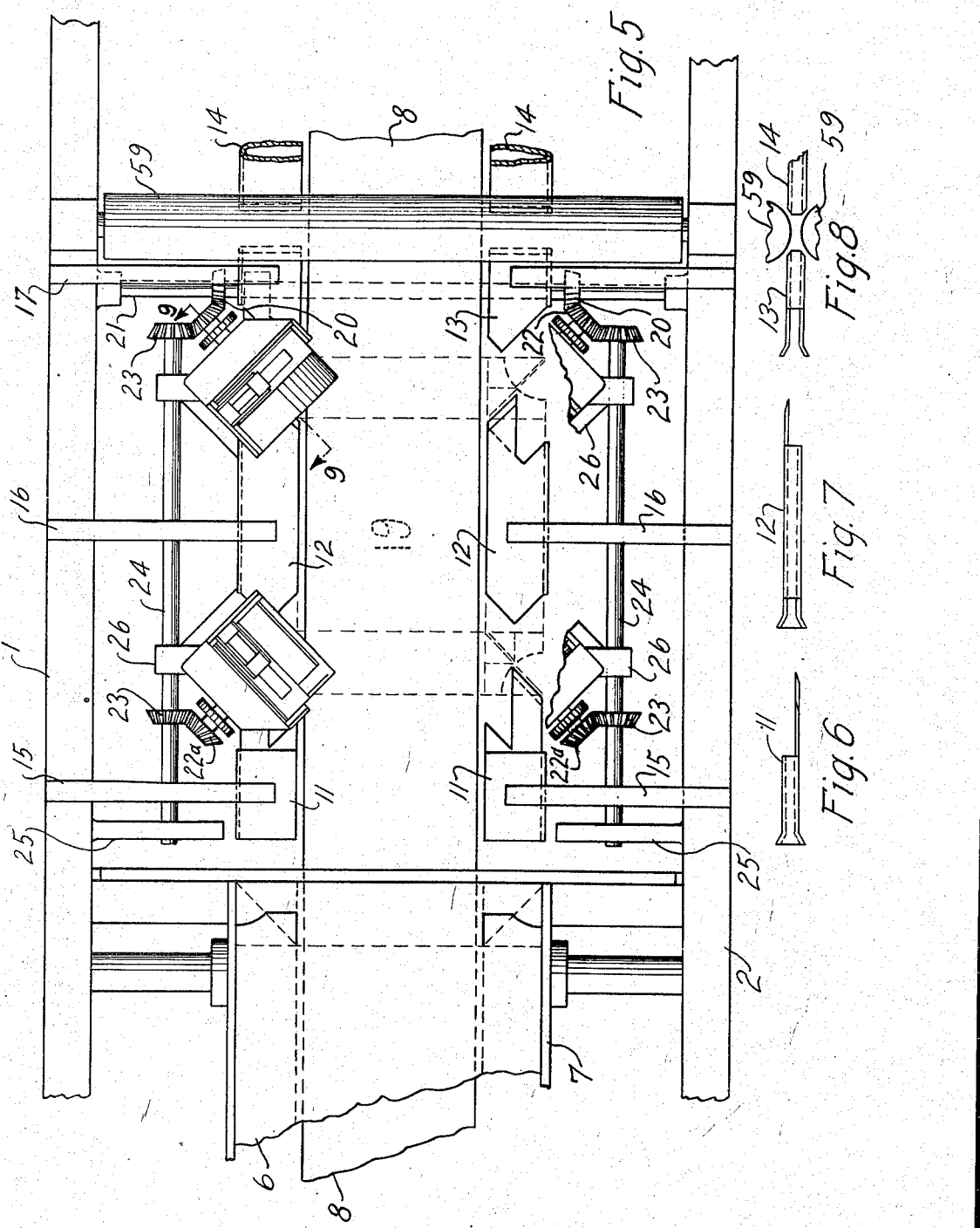

March 22, 1938.　　　M. H. SIDEBOTHAM　　　2,112,121
METHOD AND MACHINE FOR MAKING LOCKED CORNER BOXES
Filed June 3, 1936　　　6 Sheets-Sheet 4
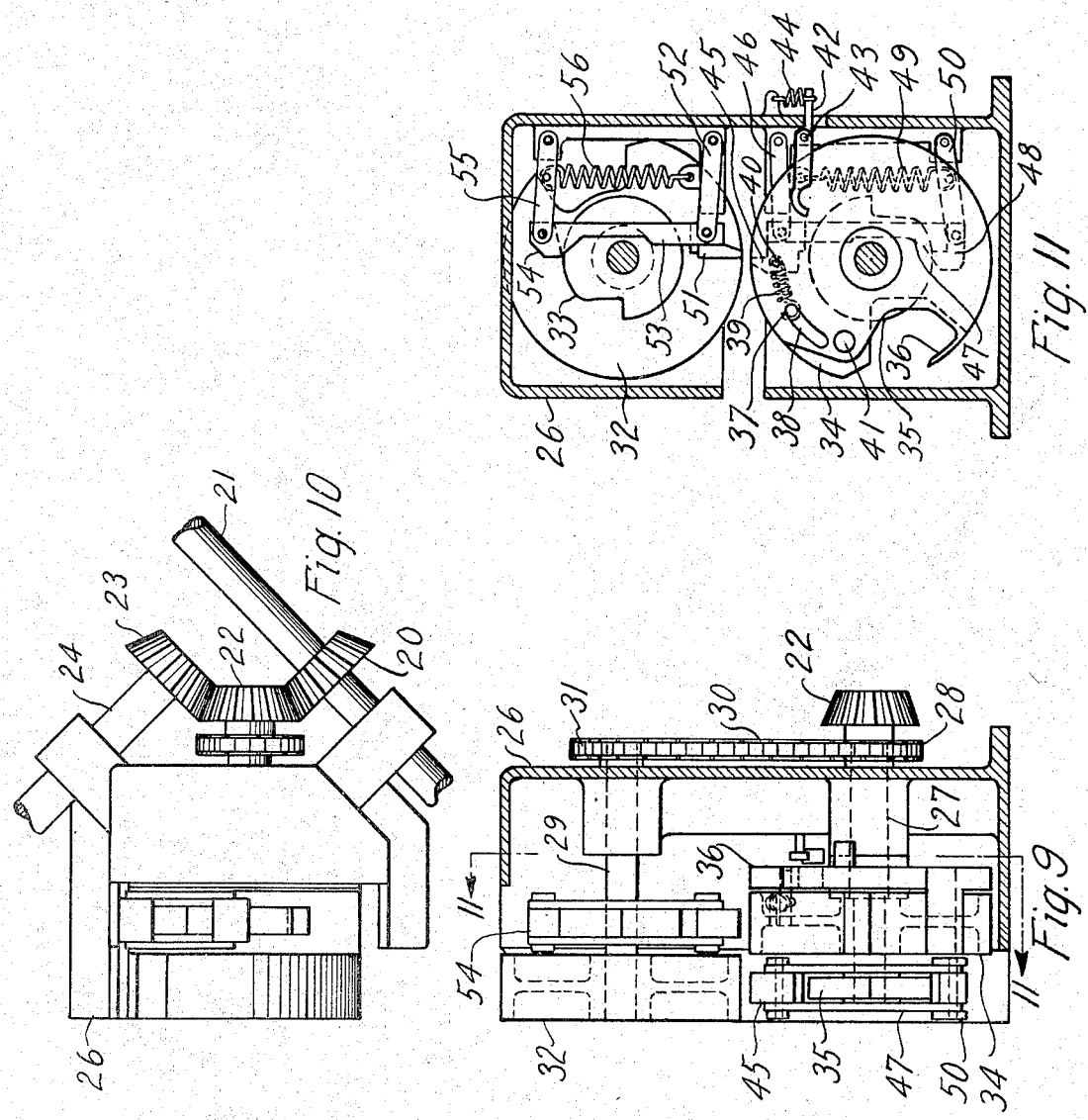
Inventor
Melvin H. Sidebotham March 22, 1938.   M. H. SIDEBOTHAM   2,112,121
METHOD AND MACHINE FOR MAKING LOCKED CORNER BOXES
Filed June 3, 1936   6 Sheets-Sheet 5
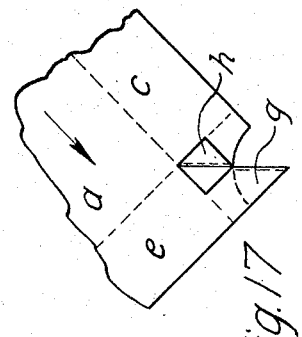
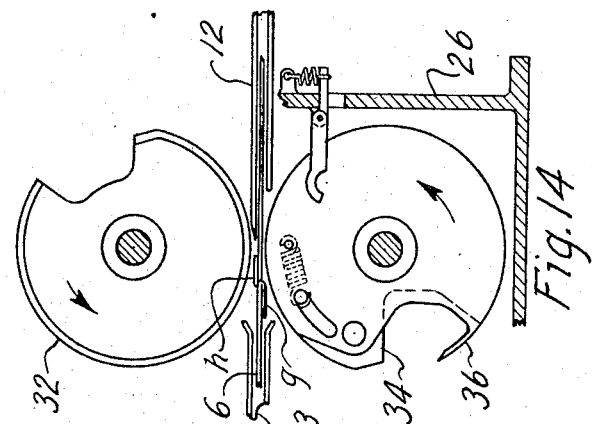
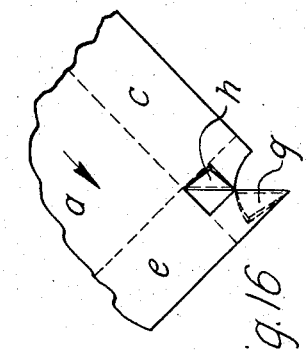
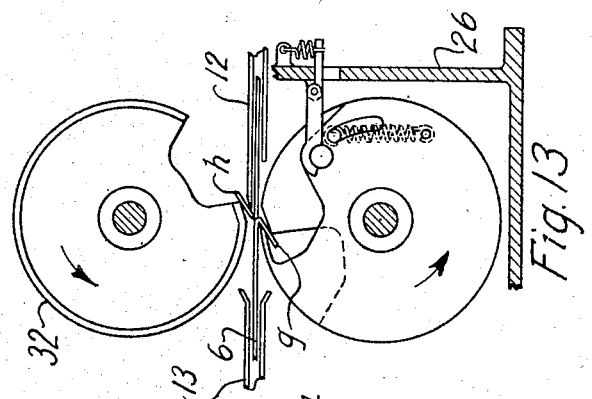
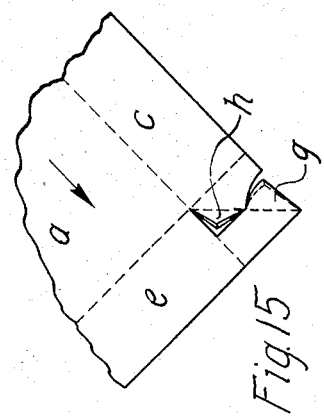
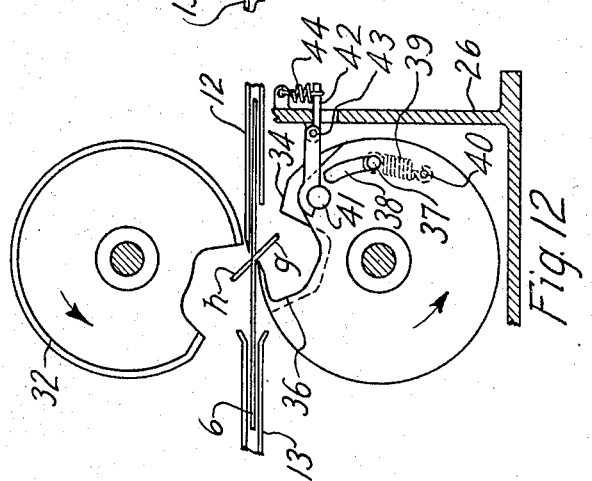
Inventor
Melvin H. Sidebotham March 22, 1938.    M. H. SIDEBOTHAM    2,112,121
METHOD AND MACHINE FOR MAKING LOCKED CORNER BOXES
Filed June 3, 1936    6 Sheets—Sheet 6
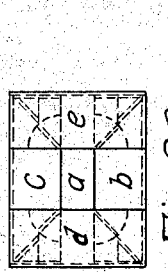
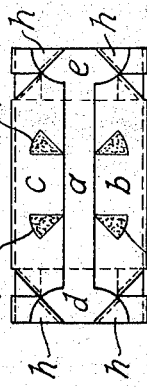
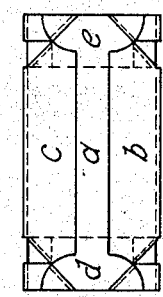
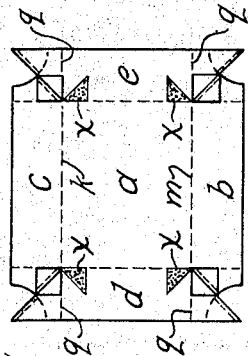
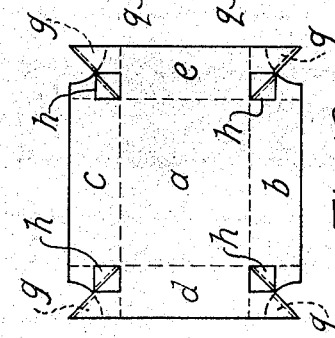
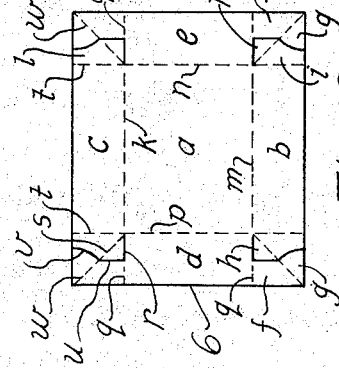
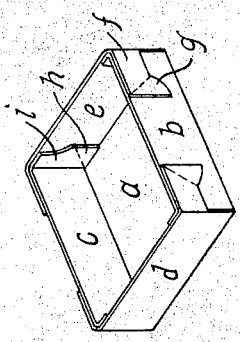
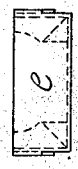
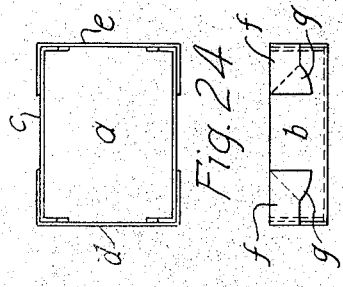
Inventor
Melvin H. Sidebotham Patented Mar. 22, 1938

2,112,121

UNITED STATES PATENT OFFICE 2,112,121

METHOD AND MACHINE FOR MAKING LOCKED CORNER BOXES

Melvin H. Sidebotham, West Newton, Mass., assignor to Specialty Automatic Machine Company, Medford, Mass., a corporation Application June 3, 1936, Serial No. 83,263

19 Claims. (Cl. 93—49)

This invention relates to the manufacture of boxes of the class shown in the patent to Joseph R. Myers, dated May 12, 1914, entitled "Folding box", being Patent Number 1,096,118. Boxes of this type are commonly known as "knock-down" or wall boxes which are furnished to the trade in flat or collapsed condition for purposes of saving space in stock rooms and in stores where they are to be used, and also for saving transportation costs. Such boxes are opened or "set-up" as they are needed for use, and when set up have upright walls. Boxes of this type are used for the packaging of eggs, bakery goods, clothing and many other products, but it is to be understood that I do not limit myself to the manufacture of boxes for such specific uses.

Knock-down boxes having walls which are not creased or scored, in order to render them collapsible, are more difficult to make than those which have fold lines crossing the wall surfaces. Boxes of the type illustrated by Figures 23 to 27 inclusive, while very desirable from the point of view of convenience, have never been marketed to any great extent, because of the inability to manufacture them economically with existing machinery. Boxes of this type have unscored walls that stand upright from the bottom when the boxes are to be used. A further requirement is that the box must not have a tendency to return to a collapsed condition. This is effected by the so-called lock corner construction which so far as I am aware has never before been made by automatic machinery.

The present invention includes a novel method of producing "knock-down" boxes by a sequence of operations which makes it possible to produce boxes at high speed.

One of the objects of my invention is to effect rapid production of knock-down wall boxes by a sequence of operations, comprising the feeding of a cut and scored paper blank to a carrier, progressively advancing the blank to folding and adhesive applying devices and discharging the box in knock-down condition ready to be set up for use.

Other more specific objects and advantages of the invention will be apparent to persons skilled in the art as the same becomes better understood by reference to the following description, taken in connection with the accompanying drawings, in which I have illustrated one practical embodiment of the invention, and wherein:—

Figure 5 represents a plan view on line 5—5 of Figure 2 on a larger scale.

Figure 6 represents a side view of blank guide 11 shown in Figures 1 and 5.

Figure 7 represents a side view of blank guide 12 shown in Figures 1 and 5.

Figure 1:
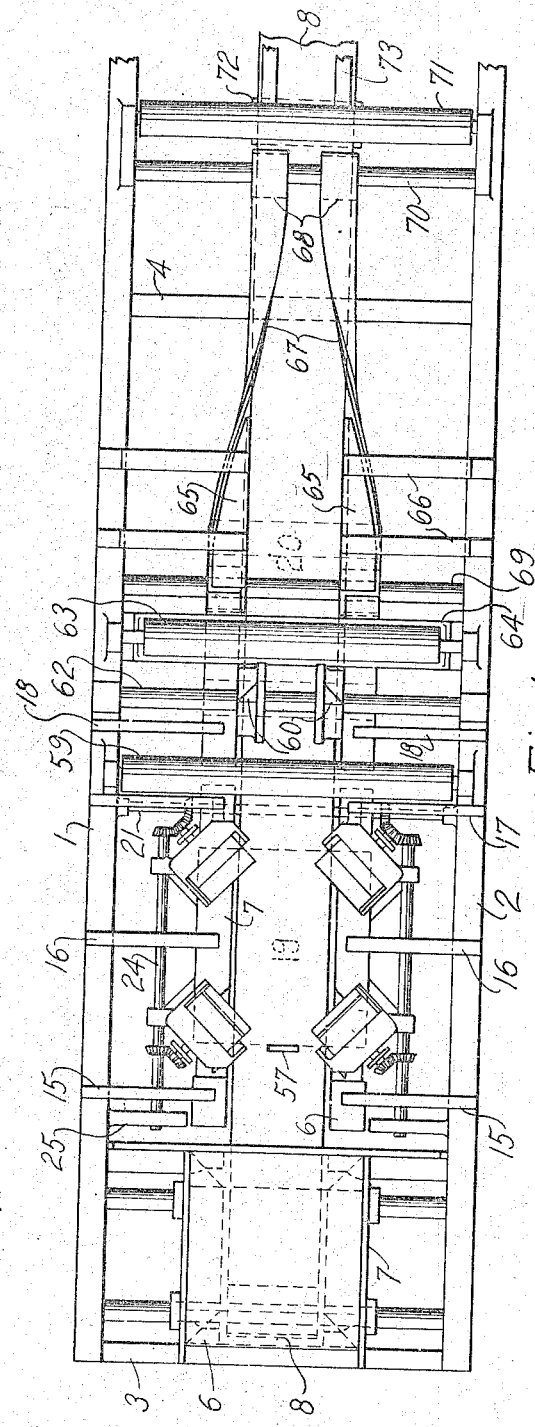
Figure 1 is a plan view of the feed end of the machine.
Figure 2:
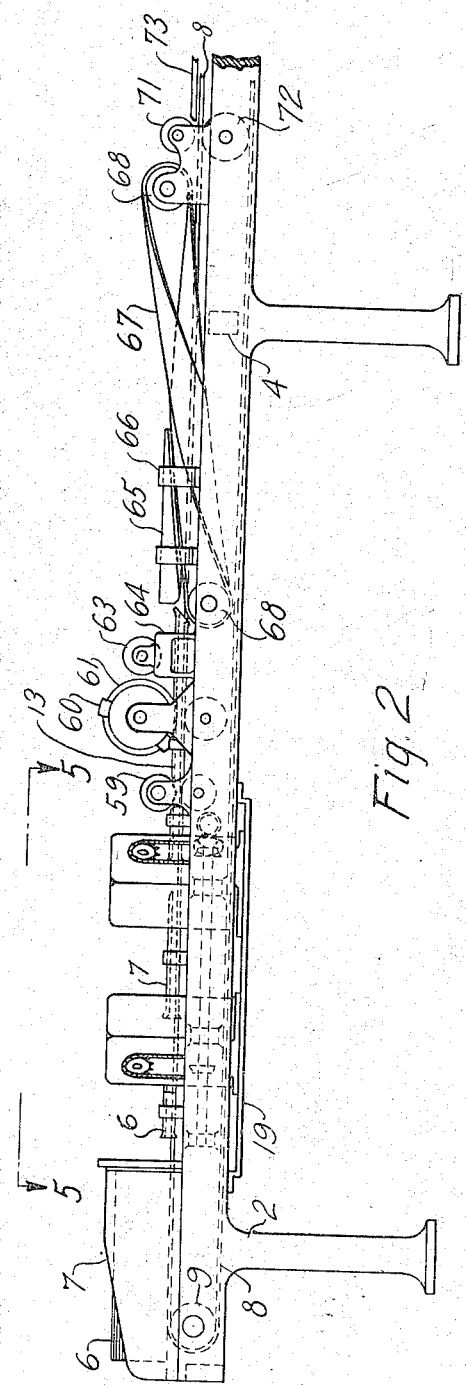
Figure 2 is a side elevation of the feed end of the machine.

Figure 8 represents a side view of blank guide 13 and a side view of a portion of blank guide 14 shown in Figures 1 and 5.

Figure 9 represents a partial section on line 9—9 of Figure 5 on a larger scale.

Figure 10 represents an enlarged plan view of one of the forward flap folding mechanisms.

Figure 11 represents a section on line 11—11 of Figure 9.

Figures 12, 13 and 14 are diagrammatic illustrations showing the operation of the flap folding devices shown in Figure 11.

Figures 15, 16 and 17 are plan views of a corner of the blank and illustrate the effect of the flap folding devices on the blank.

Figure 18 represents a plan view of the cut and scored blank from which the box is formed.

Figure 19 represents a plan view of the blank after it has been acted upon by folding devices which fold certain flap sections downward and then up against the under-side of the blank and fold other flap sections upward and then down against the top surface of the blank.

Figure 20 illustrates a plan view of the blank after adhesive has been applied to areas of the end walls of the blank.

Figure 21 represents a plan view of the blank after the front and rear margins have been folded.

Figure 22 represents the blank after adhesive has been applied to areas of the front and rear walls.

Figure 23 is a plan view of the completed box in flat folded condition.

Figure 24 is a plan view of the box in set-up condition.

Figure 25 is a side elevation of the box after it has been set-up.

Figure 26 is an end view of the box in set-up condition.

Figure 27 is a perspective view of the box shown in Figures 24, 25 and 26 tilted so as to show a portion of the interior thereof.

It will aid toward an understanding of the operation of the machine and of the method of fabricating the box, to first explain the action of the machine which effects the production of the completed box in "knock-down" condition from a cut and scored blank. Figure 18 illustrates the cut and scored blank wherein scored lines are indicated by dash lines marked $k$, $m$, $n$, $p$, $q$, $s$, $t$ and $w$, cut lines are shown as full lines marked $r$, $u$ and $v$. The said cut lines and scored lines effect a division of the blank to form a bottom section $a$, a front wall section $b$, a rear wall section $c$, end wall sections $d$ and $e$, end wall extensions $f$, end wall extension flaps $g$, front and rear wall extension $i$, front and rear wall extension flaps $h$. Figure 19 illustrates the condition of the blank after it has been acted upon by flap folding devices which fold flaps $h$ upward and then down against the top of the front and rear wall extensions. Flap folding devices also fold flaps $g$ downward and then up against the bottom of the end wall extensions. The blank is then acted upon by devices which deposit adhesive to areas marked $x$ (Fig. 20). Devices then fold the blank along lines $k$, $m$ and $q$ with the result that folded flaps $h$ will contact the adhesively treated areas $x$ as shown in Figure 21. Adhesive is then applied to areas $y$ of the front and rear wall sections (Fig. 22). The blank is then folded on lines $n$, $p$ and $t$ with the result that folded flap sections $g$ will contact the adhesively treated areas $y$, thus completing the box in flat folded condition (Figure 23) ready to be set up for use. The boxes are set-up for use by simply raising the side walls $b$ and $c$ (Fig. 23), with the result that the wall extensions $i$ will snap outward against the inside surface of the end walls and the wall extensions $f$ will unfold against the outside surface of the front and rear walls.

Figure 3:
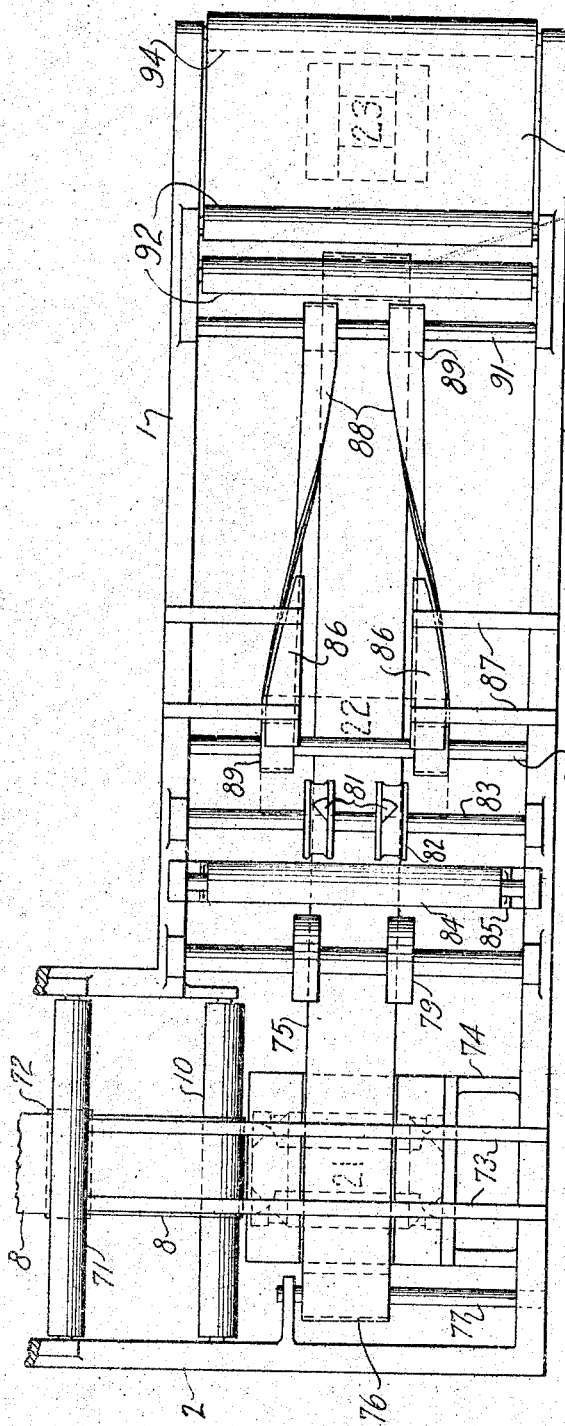
Figure 3 is a plan view of the delivery end of the machine, which is at right angles to the feed end of the machine, shown in Figure 1.
Figure 4:
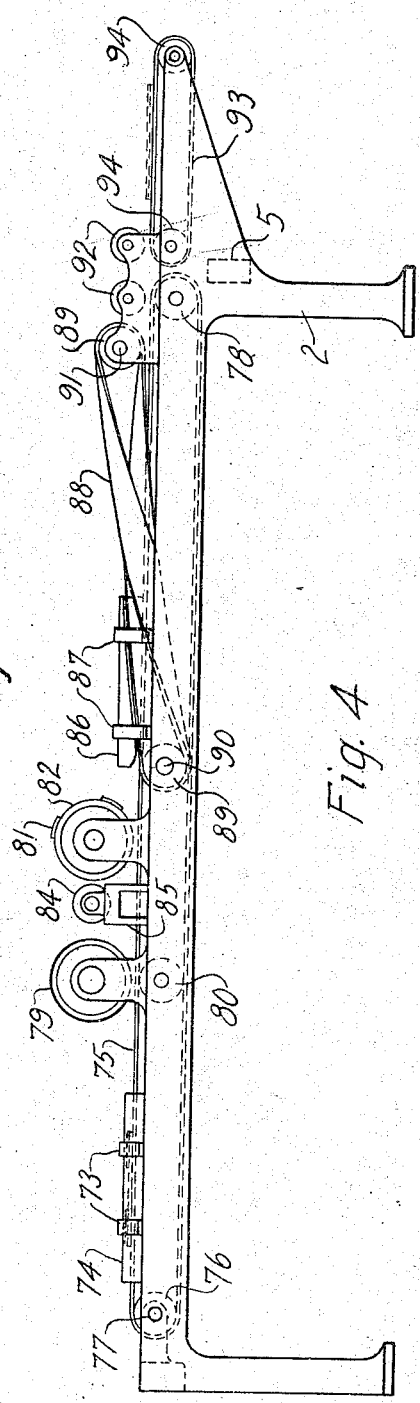
Figure 4 is a side elevation of the delivery end of the machine.

Referring to Figures 1 and 3, these two figures, taken together, indicate a plan view of the entire machine. The upper left hand portion of Figure 3 duplicates parts shown at the right hand end of Figure 1 to render it clear that the parts of the machine shown in the two figures operate at an angle to each other. In said Figures 1 and 3 some of the positions of the blanks are indicated by dotted lines where the dotted numerals 19, 20, 21, 22 and 23 appear. Those dotted numerals are employed because at those points of the machine the blanks are in substantially the condition shown by Figures 19 to 23 inclusive. In other words, each blank when it reaches 19 (Fig. 1) is as shown in Figure 19; when it reaches position 20 it is substantially as shown by Figure 20; and so on until when it reaches position 23 (Fig. 3) it is substantially as shown by Figure 23. The timing is such that when the machine is in operation different parts of the machine are operating simultaneously on blanks which are spaced about as indicated by the dotted line indications of the blank in Figures 1 and 3. In other words, while one part of the machine is performing an operation on one blank other parts of the machine are at the same time performing other operations on other blanks, all of said blanks following one another progressively through the machine and are delivered therefrom as complete boxes in collapsed condition as shown in Figure 23.

It will be readily understood, without need of illustration, that any suitable motor may be employed for operating the machine, and that suitable gearing is employed in practice to cause the various rolls and shafts to rotate at uniform peripheral speed to effect travel of the blanks through the machine and to operate the various devices which act on the blanks in the sequence described.

The frame of the machine consists of sideframes 1 and 2 and crossbars 3, 4 and 5 (Figs. 1, 2, 3, 4), suitable bearings are provided in said sideframes for attaching the different mechanisms to the frame.

Blanks 6 which have been shaped, creased and cut, as indicated in Figure 18 and more fully described above, may be cut and scored by any of the well known methods in common use in the art. Blanks 6 of the shape above described are delivered successively from a feed table 7 to a conveyor belt 8 carried by rolls 9 and 10 journaled in sideframes 1 and 2 (Figs. 1 and 3). The blanks are advanced by conveyor belt 8 to guide bars 11, 12, 13 and 14 (Figs. 5, 6, 7 and 8) supported by arms 15, 16, 17 and 18. When the blank reaches the position indicated by the dotted outline of the blank and marked by dotted numeral 19 in Figures 1 and 5 the blank is operated on by devices which fold the extension flaps $g$ and $h$ to the condition illustrated by Figure 19. The flap folding mechanism includes four units adjustably mounted on bed plate 19 supported by sideframes 1 and 2. The said flap folding units are driven from power shaft 21 by gears 20 fixed thereon which drive gears 22 thus operating the forward folding units. Gears 22a which operate the rear folding units are driven from gears 22 of the forward folding units by means of gears 23 carried by shafts 24 supported by bearings 25 and casings 26. The operating shaft 27 on each flap folding unit (Figs. 9 and 11) is driven by gear 22 fixed thereon. Sprocket 28 fixed on said shaft 27 drives shaft 29 by means of chain 30 and sprocket 31. Fixed on said shaft 29 of each forward folding unit, is a flap folding segment 32 and a cam 33. Operating shaft 27 has fixed thereon a flap folding segment 34 and a cam 35. The flap folding guide segment 36 is supported by, but not fixed to, said shaft 27. Said guide segment 36 is driven from flap folding segment 34 by means of pin 37 in segment 34. Said pin 37 extends into slot 38 of segment 36. The relation of said segments 34 and 36 is governed by the said slot and spring 39 suspended between said pin 37 and pin 40 which is fixed in guide segment 36. Pin 41 on guide segment 36 is placed to engage lever 42 pivoted on pin 43 supported by casing 26. Spring 44 serves to resist pivoting of lever 42. The lower flap bending finger 45 (Figs. 9 and 11), guided by links 46, is caused to operate up and down at predetermined intervals by connecting links 47 to which is attached cam follower 48 and links 50. Spring 49 has one end connected to links 50 and the other to casing 26. The upper flap bending finger 51, guided by links 52, is caused to operate up and down at predetermined intervals by connecting links 53 to which is attached cam follower 54 and links 55. Spring 56 has one end connected to links 55 and the other to casing 26.

Figures 12, 13 and 14 illustrate the operation of the flap folding segments 32 and 34 and also the action of flap guide segment 36. The arrows indicate the direction of rotation.

Figures 15, 16 and 17 are plan views of a corner of the blank 6 shown in Figures 12, 13 and 14 respectively. The arrows indicate the direction of travel of the blanks.

The four flap folding units are similar to each other except that the two units which act on the rear corners of the blank are assembled so that the folding mechanisms (Figs. 9 and 11) on shafts 27 and 29 are reversed, with the result that the mechanism on shaft 27 of Figures 9 and 11 will operate on the top of the blank and the folding mechanism shown on shaft 29 will operate on the under side of the blank.

The blank is advanced from the flap folding devices by conveyor belt 8 which is provided with lugs 57 which at timed intervals arrive at the rear edge of the blanks to propel them forward. In the progress of the blank forward it passes between pressing rolls 59 journaled in sideframes 1 and 2. While the blank is being conveyed forward adhesive is applied thereon to predetermined areas (marked $x$ in Fig. 20) by pads 60 fastened to wheels 61 fixed to shaft 62 journaled in sideframes 1 and 2. Adhesive is applied to said pads 60 by contacting adhesively coated roll 63 journaled in sideframes 1 and 2. Said roll 63 is coated with adhesive by causing it to rotate in liquid adhesive contained in reservoir 64 supported by sideframes 1 and 2. The blank is then carried forward to folding devices which fold the blank on lines $k$, $m$ and $q$ (Fig. 18) which results in the blank taking the form illustrated by Figure 21. Said folding devices consist of guides 65 supported by arms 66 fastened to sideframes 1 and 2; folding belts 67 carried by pulleys 68 mounted on shafts 69 and 70 journaled in sideframes 1 and 2. The blank is then carried to pressing rolls 71 and 72, thence under guards 73 supported by sideframe 2 to transfer table 74 supported by sideframe 2. From said transfer table 74 the blank is carried forward by conveyor belt 75 propelled by roll 76 mounted on shaft 77 journaled in sideframe 2. The forward end of said conveyor belt 75 is supported by roll 78 journaled in sideframes 1 and 2. The blank then passes between rolls 79 and 80 journaled in sideframes 1 and 2, and thence to adhesive applying devices. Adhesive is applied to predetermined areas (marked $y$ in Fig. 22) by pads 81 fastened to wheels 82 fixed to shaft 83 journaled in sideframes 1 and 2. Adhesive is applied to said pads 81 by contacting adhesively coated roll 84 journaled in sideframes 1 and 2. Said roll 84 is coated with adhesive by causing it to rotate in liquid adhesive contained in reservoir 85 supported by sideframes 1 and 2. The blank is then advanced to folding devices which fold the blank on lines $n$, $t$ and $p$ (Fig. 22) which results in the completion of the box in flat condition shown by Fig. 23. Said folding devices consist of guides 86 supported by arms 87 fastened to sideframes 1 and 2 and folding belts 88 carried by pulleys 89 mounted on shafts 90 and 91 journaled in sideframes 1 and 2. The blank is then carried under pressing rolls 92 journaled in sideframes 1 and 2, thence to the delivery belt 93 carried by rolls 94 journaled in sideframes 1 and 2.

While the invention includes the combined instrumentalities above mentioned, I wish it to be understood that I consider the aforesaid means not only combinatively novel, but insofar as I am aware, certain of the devices going to make up such means are new in less combinations than the whole and some capable of individual use, as will more clearly appear hereinafter.

Having now described my invention, what I claim is:—

1. The method of making boxes from blanks which are cut and creased to provide a bottom section, front and rear wall sections and end wall sections extending from said bottom sections, extension sections projecting from each end of the said front and rear wall sections and extension sections projecting from each end of the said end wall sections, each of said extension sections being intersected by a creased line radiating substantially from the apex of the corner of the bottom section to form a flap at the outer end of each extension section; the said method consists of folding the said flaps on said lines radiating from the apex of the corner of the bottom, the flaps at the ends of the front and rear wall extension sections being folded upward and then down against the top of said extension sections and the flaps at the ends of the end wall extension sections being folded downward and then up against the under side of said extension sections, applying adhesive to predetermined areas of the end wall sections, folding the front and rear wall sections and their extension sections and the extension sections at the ends of the end wall sections upward and then down upon the bottom section and the end wall sections, applying adhesive to predetermined areas on the upward facing surface of front and rear wall sections, folding the end wall sections and the extension sections thereon and the extension sections at the ends of the front and rear wall sections upward and then down upon the ends of the front and rear wall sections.

2. The method of making collapsed paper boxes from a cut and scored blank by a sequence of operations consisting of causing the blank to travel, folding some corner flaps of the blank against the upper surface of the blank while at the same time folding other corner flaps of the blank against the under surface of the blank, applying adhesive to predetermined areas of the blank, and folding marginal portions of the blank so that the folded flaps will coincide with the adhesively treated areas.

3. The method of making collapsed paper boxes from a blank by a sequence of operations consisting of folding some corner flaps of the blank against the upper surface of the blank while at the same time folding other corner flaps of the blank against the under surface of the blank, applying adhesive to predetermined areas of the blank, and folding marginal portions of the blank so that the folded flaps will coincide with the adhesively treated areas.

4. The method of making collapsed boxes from a paper blank by a sequence of operations consisting of folding some corner flaps of the blank against the upper surface of the blank and folding other corner flaps against the under surface of the blank, applying adhesive to predetermined areas of the blank, and folding marginal portions of the blank so that the folded flaps will coincide with the adhesively treated areas, substantially as described.

5. The method of making collapsed paper boxes from a blank by a sequence of operations consisting of folding some corner flaps of the blank against the upper surface of the blank and folding other corner flaps against the under surface of the blank, folding the marginal portions and securing the folded flaps to the proximate surfaces of the wall portions of the blank, substantially as described.

6. In a machine for making folded wall boxes, means for supplying blanks singly and successively to a position of rest, mechanism for folding predetermined areas upward and then down against the top surface of the blank and for folding other areas downward and then up against the under surface of the blank, devices for folding front and rear wall margins of the blank toward each other, and means for folding the ends of the partly formed box toward each other substantially as described.

7. In a machine for making folded wall boxes, means for supplying blanks singly and successively to a position of rest, devices for simultaneously folding certain flap sections of the blank upward and then down against the top of the blank while folding other flap sections downward and then up against the under surface of the blank, devices for folding front and rear wall margins of the blank toward each other, and means for folding the ends of the partly formed box toward each other substantially as described.

8. In a machine for making wall boxes, means for supplying blanks singly and successively, devices for folding certain flap sections of the blank upward and then down against the top of the blank and for folding other flap sections downward and then up against the under surface of the blank, devices for folding front and rear wall margins of the blank toward each other, and means for folding the ends of the partly formed box toward each other substantially as described.

9. In a machine for making folded wall boxes from paper blanks, mechanism for folding certain flap sections of the blank upward and then down against the top surface of the blank and folding other flap sections downward and then up against the under surface of the blank, devices for folding front and rear wall margins of the blank toward each other, and means for folding the ends of the partly formed box toward each other substantially as described.

10. In a machine for making folded wall boxes, means for advancing blanks singly and successively, folding devices for simultaneously folding certain flaps upward and then down against the top of the blank and for folding other flaps downward and then up against the under side of the blank, means for applying adhesive to predetermined areas of the blank, devices for folding front and rear margins of the blank toward each other and then down against the center section, and devices for folding the ends of the blank upward and then down against the folded front and rear margins.

11. In a machine for making folded wall boxes, means for advancing blanks, devices for doubling certain flap sections against the top surface of the blank and at the same time doubling other flap sections against the under surface of the blank, means for applying adhesive to predetermined areas of the blank, devices for folding front and rear margins of the blank against the top surface of the blank, and devices for folding the ends of the blank upward and then down against the folded front and rear margins.

12. In a machine for making folded wall boxes, blank carrying mechanism, means for doubling portions of the corner sections of the blank, consisting of mechanism for folding some of said portions upward and other portions downward, devices for folding front and rear wall margins of the blank toward each other, and means for folding the ends of the partly formed box toward each other, substantially as described.

13. A machine for making folded wall boxes, comprising two sections the first of which consists of blank carrying mechanism, devices for doubling certain flap elements of the blank against the top surface and for doubling other flap elements against the under surface, means for applying adhesive to predetermined areas of the blank for the purpose of adhesively securing the flaps on the top surface of the blank to the end walls, devices for longitudinally folding the side margins of the blank toward each other; the other section of the machine consists of devices for conveying the blank, mechanism for applying adhesive to predetermined areas of the blank for the purpose of adhesively securing the flaps on the under surface to the front and rear walls, and devices for folding the end wall sections upward and over against the folded front and rear wall sections.

14. In a machine for making boxes from cut and creased blanks, means for bending certain portions of the blank downward while bending certain other portions of the blank upward, a pair of circular segments one operating at the top of the blank and the other operating at the under side of the blank, the segment at the top of the blank operating to completely fold that portion of the blank which is bent upward while the segment at the underside of the blank operates to completely fold that portion of the blank which is bent downward.

15. In a machine for making boxes from cut and creased blanks, means for bending certain portions of the blank upward while bending certain other portions of the blank downward, a segment operating to completely fold that portion of the blank which is bent upward and a segment operating to completely fold that portion of the blank which is bent downward, substantially as described.

16. The combination, in a box making machine, of a conveyor mechanism, with devices for doubling certain flap sections against the top surface of the blank while doubling other flap sections against the under surface of the blank, and having adhesive applying devices and folding devices, all substantially as set forth.

17. In a machine for making folded wall boxes from creased and cut blanks having a bottom section, front and rear wall sections, end wall sections and four corner sections, each corner section being so cut as to provide two wall extensions, each of said extensions having a flap at its outer end; blank carrying mechanism, flap folding devices comprising, mechanism for doubling certain flaps of the blank against the top surface and for doubling other flaps against the under surface, means for adhesively securing the flaps on the top surface of the blank to the end walls, and means for adhesively securing other flaps to the front and rear walls, substantially as described.

18. The combination in a box making machine, of means for advancing a prepared box blank, fingers for bending a pair of flap sections at one end of the blank upward and fingers for bending a pair of flap sections at the opposite end of the blank downward, a plurality of guide bars to assure bending the said flap sections on predetermined lines, folding segments for folding the upwardly bent flaps against the top surface of the blank, and folding segments for folding the downwardly bent flaps against the under surface of the blank.

19. The combination in a box making machine, of means for advancing a prepared box blank, fingers for bending a pair of flap sections at one end of the blank downward and fingers for bending a pair of flap sections at the opposite end of the blank upward, a plurality of pivotally mounted guide segments to assure bending the said flap sections on predetermined lines, pivotally mounted folding segments for folding the downwardly bent flaps against the under surface of the blank, and folding segments for folding the upwardly bent flaps against the top surface of the blank.

MELVIN H. SIDEBOTHAM.